Sept. 13, 1966 P. J. S. McNENNY 3,272,521
FLUID SEAL
Original Filed Jan. 8, 1962 2 Sheets-Sheet 1
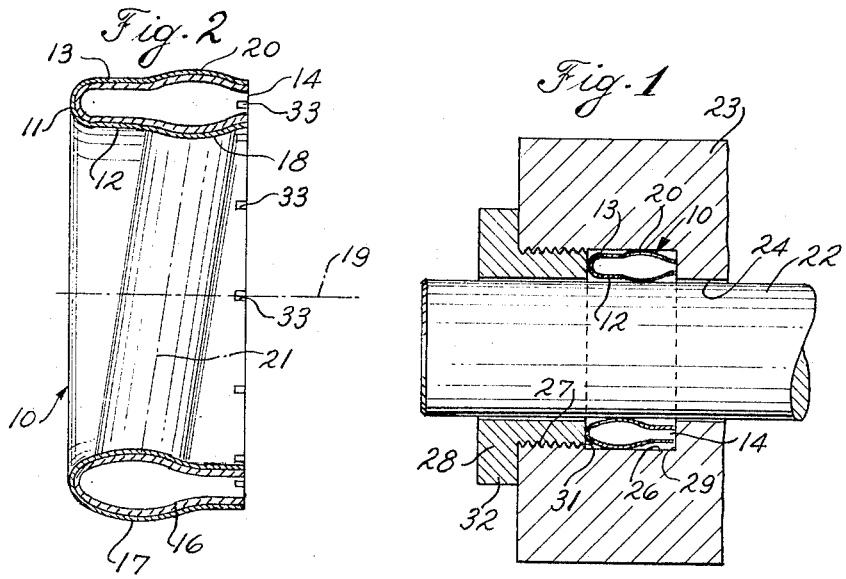
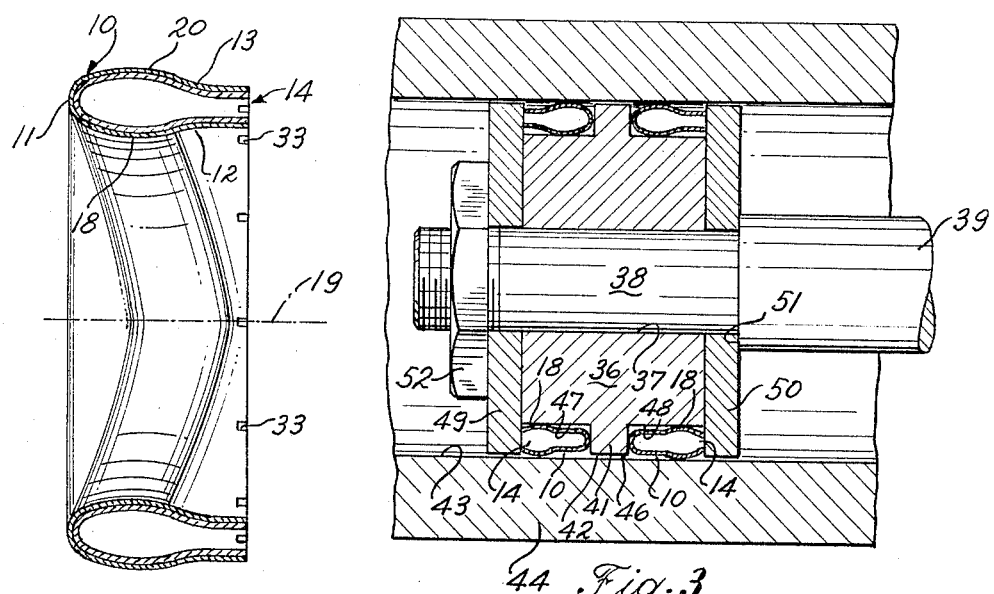
INVENTOR.
PATRICK J. S. McNENNY
BY
RICHEY, McNENNY & FARRINGTON
ATTORNEYS Sept. 13, 1966    P. J. S. McNENNY    3,272,521
FLUID SEAL
Original Filed Jan. 8, 1962    2 Sheets-Sheet 2
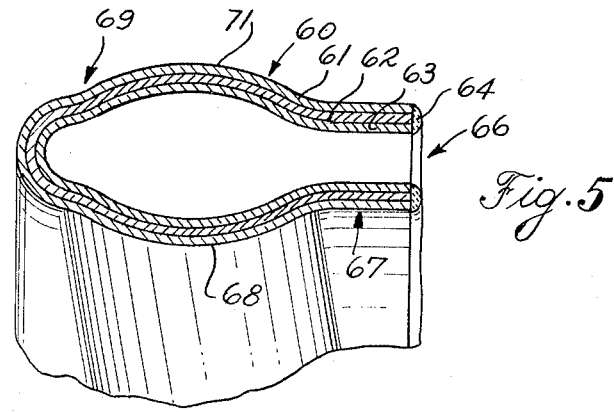
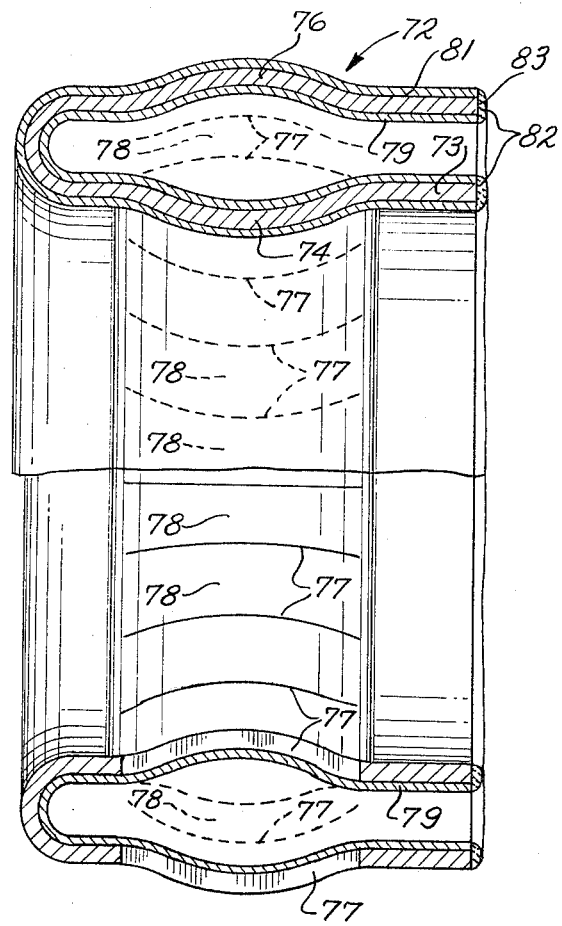
INVENTOR.
PATRICK J. S. McNENNY
BY
RICHEY, McNENNY & FARRINGTON
ATTORNEYS United States Patent Office 3,272,521
Patented Sept. 13, 1966

3,272,521
FLUID SEAL
Patrick J. S. McNenny, 11820 Edgewater Drive,
Lakewood, Ohio
Continuation of application Ser. No. 164,816, Jan. 8,
1962. This application Mar. 4, 1965, Ser. No. 449,350
9 Claims. (Cl. 277—205)

This is a continuation of my prior co-pending application Serial No. 164,816 filed January 8, 1962, now abandoned.

This invention relates generally to fluid seals and more particularly to a novel and improved dynamic seal suitable for use in severe pressure and temperature installations.

In the past it has been customary to use dynamic seals formed of rubber-like material to prevent leakage between two relatively movable parts. Such seals have often been constructed so that a relatively light initial deflection or pre-set is provided to establish the seal and so that the sealing pressure is increased by the pressure of the fluid being sealed to maintain a pressure of engagement between the seal and the mating surface which exceeds the pressure of the fluid being sealed. Rubber-like materials have a property of substantial deflections without excessive loads so they can be used where the tolerances of manufacture are relatively large.

Rubber-like sealing elements, however, are generally unsatisfactory for rotary seals since a film of lubricant is required for satisfactory wear characteristics and, in rotary seals, the film of lubricant is not carried under the seal by the relative movement of the parts. In other installations where the seal must pass over the ports or other recesses in the mating surface, rubber seals are unsatisfactory because they deflect into the recess and are then torn or sheared by the approaching recess edge. In addition, rubber-like materials are generally unsuitable for use at elevated pressures since extrusion takes place causing seal failure. Also, such materials are relatively unsatisfactory in elevated temperatures since high temperatures produce rapid deterioration of the seal material.

Many attempts have been made to utilize metallic seals to overcome these difficulties since metal is resistant to deterioration at higher temperatures than rubber-like materials, and since a metal seal is capable of passing over properly shaped ports or recesses without shearing or tearing. In general, however, metal seals have had serious faults which have, in the past, limited their use.

Metals in general are relatively non-elastic. Therefore, the amount of deflection of metallic seals which can be tolerated is very small. For this reason, metal seals must be manufactured with extreme accuracy to prevent excessive deformation and excessive loads. This high precision requirement in metallic seals has limited their use since manufacturing costs increase drastically when tolerances are reduced. Also, such metallic seals do not provide long life since very small amounts of wear will change the dimensions of the element a sufficient amount to cause the elements to reach a condition wherein the proper sealing operation will not be achieved.

In a seal assembly incorporating this invention, metallic elements are provided which may be deflected through substantial ranges without excessive loads. Therefore, the manufacturing tolerances may be greater and the cost of production substantially reduced. Also, the fact that the metallic sealing element can deflect through substantial ranges without excessive loads minimizes the pre-set pressure so that friction and wear are reduced. The seal element is shaped so that the sealing pressure of the seal is a direct function of the pressure of the fluid being sealed, plus the initial pre-set pressure, so the sealing pressure of the assembly is always maintained higher than the pressure of the fluid being sealed and leakage does not occur.

In one form of this invention the metallic sealing element has a composite structure including a base metal chosen for strength and flexibility and a surface coating thereon chosen to provide desirable wearing and sealing properties. The sealing element, therefore, can be used successfully when optimum lubrication is not possible. The seal incorporating this invention is also suitable for use at elevated temperatures and pressures since material deterioration or extrusion will not occur. Still further, the properties of the metallic seal incorporating this invention permit the seal to be operated over ports or recesses in the mating surface without detrimental effect.

It is an important object of this invention to provide a novel and improved fluid seal assembly suitable for operation at elevated temperatures.

It is another important object of this invention to provide a novel and improved metallic seal constructed to permit substantial deflections of the seal element without excessive pressures or the like.

It is another important object of this invention to provide a novel and improved seal assembly constructed and arranged to provide substantial deflections of the seal element without producing excessive stress in the material forming the seal element.

It is still another important object of this invention to provide a metallic seal assembly having a base member constructed to permit substantial deflection thereof and a surface coating thereon having desirable sealing and wearing characteristics.

It is still another object of this invention to provide a metallic seal element having an annular shape and a cross-section formed as an axially extending cup wherein the walls of the seal element are substantially uniform in thickness and means are provided to permit substantial radial deflections of the sealing element.

It is still another object of this invention to provide a metallic seal element having an annular shape with an axially extending cup shape cross-section wherein the radial walls are formed with projecting portions inclined relative to a plane perpendicular to the axis of the element.

It is still another object of this invention to provide a novel and improved metallic seal element deflectable through a substantial range without producing excessive stress in the material of the seal.

Further objects and advantages will appear from the following description and drawings wherein:

FIGURE 1 is a side elevation in longitudinal section of one form of a seal incorporating this invention mounted to provide a seal with a movable shaft;

FIGURE 2 is an enlarged longitudinal section of one preferred form of a seal incorporating this invention illustrating the structural details thereof;

FIGURE 3 is a longitudinal section of an installation of the seal on a piston head illustrating how the seal may be installed in a fluid pump or actuator;

FIGURE 4 is a longitudinal section of a form of ring arranged to eliminate any fluid pressure side loads on the associated members;

FIGURE 5 is a fragmentary section of a laminated form of sealing ring; and

FIGURE 6 is a longitudinal section of another form of seal incorporating this invention illustrating the structural details thereof.

In order to insure that a fluid seal will be established, it is necessary to form the seal element and the mating element with an interference fit to assure an initial contact between the elements. This interference fit produces a pre-set or initial sealing pressure which prevents leakage when the differential pressure across the seal is low. In a seal incorporating this invention, the pressure of the fluid being sealed acts upon the seal element to increase the sealing pressure as the pressure being sealed increases. Therefore, the sealing pressure between the seal element and the mating surface is always maintained at a pressure higher than the pressure of the fluid being sealed. By utilizing this mode of operation, the pressure between the seal element and the mating surface is always sufficient to prevent leakage but never excessive if the initial or pre-set sealing pressure is not excessive. It is important to maintain the pressure of the sealing element against the mating surface as low as possible while still providing the required sealing pressure under any given set of conditions, since wear and friction are direct functions of pressure, and excessive pressures between the sealing element and the mating surface produces excessive friction and excessive wear.

If this seal element were formed of a simple metallic ring, it would be necessary to form the mating part with extreme accuracy so that there would be an initial contact produced by the interference fit without excessive deformation of the seal elements. Such extreme accuracy in manufacture is difficult and expensive particularly on reciprocating seal installations since any taper or run out in the mating surface beyond the tolerance of the seal element would produce either seal failure or excessive wear. Also, if the elements are manufactured with very slight interference to produce the required initial pressure of engagement, very small amounts of wear will eliminate the interference and result in seal failure.

In a seal incorporating this invention, the seal element is formed of metal but is shaped to permit substantially increased deflection without excessive pressure. This permits substantial increase in the tolerance permissible and, as a result, substantial decrease in manufacturing costs of the seal element and the mating surface. Also, a larger range of wear can be tolerated before seal failure occurs.

One form of the invention is illustrated in the drawings in FIGURES 1 through 3. The seal element 10 is a ring formed with an imperforate end wall 11, an inner axial extending leg 12, and an outer axially extending leg 13. An open end 14 is located at the end of the ring opposite the closed end wall 11.

FIGURE 1 illustrates the ring 10 installed for sealing engagement with a shaft 22 which may be either a rotating shaft or an axially reciprocating shaft. The ring 10 is mounted in a housing 23 formed with a first bore 24 which closely fits the shaft 22, a counterbore 26 formed co-axial with the bore 24, and a radial shoulder 29 extending between the bore 24 and counterbore 26. The outer end of the counterbore 26 is threaded at 27 to receive a mounting collar 28 formed with an end wall 31 which cooperates with the counterbore 26 and radial shoulder 29 to form a seal groove in which the seal ring 10 is positioned. A flange 32 on the end of the ring 28 engages the end of the housing 23 when the end wall 31 is properly positioned.

When the fluid under pressure to be encountered is on the right side of the housing, as viewed in FIGURE 1, the ring 10 is installed with the open end 14 at the right side so that the high pressure fluid can communicate through the open end 14 to the interior of the seal ring 10. To assure this communication the legs 12 and 13 are formed with a plurality of notches 33 adjacent the open end 14. The shaft 22 is sized to provide an interference fit as it extends through the ring 10 so that the inner leg 12 is radially deflected and an initial sealing engagement produced. Also, the counterbore 26 is sized to provide an interference fit with the outer leg 13 to insure the initial sealing engagement therewith.

Referring to FIGURE 2, the ring 10 is formed of a base 16 on which is coated, plated or clad a bearing material 17. The thickness of the bearing material 17 is exaggerated for purposes of illustration, however it should be understood that the bearing material thickness may vary depending upon the particular material used. The base 16 is preferably formed of iron or a steel alloy with the particular alloy determined by the invironmental conditions in which the seal is expected to be used. As an example, if the fluid being sealed is corrosive, the base material should be a steel which is resistant to such corrosive action. The base 16 is relatively thin so that the walls will bend without substantial pressure.

The bearing material or coating 17 is chosen to meet the environmental conditions to which the seal will be exposed. Where possible the bearing material should be such that it provides a relatively low coefficient of friction to reduce friction losses and wear. The bearing material should also be such that it has a lower modulus of elasticity than the base 16 and provides little resistance to deflection. Babbitt metal and bearing bronze are examples of materials for use as the bearing material 17. The particular choice of bearing material of course will be determined in a given installation by the environmental conditions to be encountered and the characteristics of the mating surface against which the seal works.

The inner leg 12 is formed with an inwardly extending projection 18 having a convex curved profile best illustrated in FIGURE 2. The projection 18, however, is inclined relative to the axis 19 of the ring 10 so that it is adjacent to the open end 14 on one side and adjacent to the closed end wall 11 on the other side of the ring. The projection 18 extends radially from the inner leg 12 a distance normally in the order of .005 inch to .020 inch depending upon the size of the ring. In the drawings the radial extent of the projection has been exaggerated for purposes of illustration. The outer leg 13 is also formed with an outwardly extending projection 20 which is also inclined relative to the axis 19 of the ring in the same manner as the projection 18. The two projections 18 and 20 are concentric and formed of similar dimension so that the ring 10 is not subject to pressure unbalance.

The surface of the bearing material 17 along the inner extremity of the projection 18 follows an inclined line 21 having a uniform predetermined radius when the leg 12 is unstressed. However, a cross-section of any plane normal to the axis 19 intersecting the line 21 will be non-circular and has an average radius exceeding the radius of the projection 18. Therefore, when the seal ring 10 is placed on a round shaft having a radius greater than the radius of the line 21 and less than the average radius of the cross-section of planes normal to the axis 19, deflection will take place causing the surface of the projection 18 in contact with the mating element to be displaced radially. However, such displacement does not cause the material of the base 16 to be stressed beyond its elastic limit nor does it produce stresses in the same magnitude that would be present if the ring material were stressed in pure hoop tension.

In effect the projection 18 results in a form of spring operating in bending rather than pure tension to permit radial deflection of the zone of engagement along the line 21 without substantial stress to the material thereof. It is therefore possible to provide a substantial degree of interference between the ring 10 and the mating part extending therethrough without producing excessive pressure along the line of engagement or excessive stressing of the material of the ring. Similarly, the projection 20 can be radially compressed through a substantial range without producing excessive pressures.

In FIGURE 4 another embodiment is illustrated which operates in the same manner as the embodiment of FIGURE 1. The ring of FIGURE 4 is constructed so that there are no pressure induced side loads on the mating elements. Since function of the elements are identical to the embodiment of FIGURE 1, the same reference numerals are used to refer to corresponding parts. The projections 18 and 20 are formed with a symmetrical serpentine path so that any section cut by a plane normal to the axis 19 is symmetrical and has an average radius different than the radius of the extremities of the projections. In the illustrated form the projections 18 and 20 extend from adjacent to the end wall 11 to adjacent the open end 14 and back to a point adjacent the closed end wall 11 in each half of the ring 10.

Referring again to FIGURE 2, as the pressure of the fluid being sealed increases, the pressure acts on the inner surface of the ring 10 to increase the pressure of engagement between the projection 18 and the shaft 22 to insure that leakage will not occur. The outer projection 20 engages the wall of the counterbore 26 with an interference fit and is therefore radially deflected in an inward direction during the assembly of the seal. Here again, the pressure of the fluid being sealed causes an increased sealing pressure between the projection 20 and the wall of the counterbore 26 as the pressure of the fluid increases.

When the fluid being sealed has lubricating qualities and the shaft 22 is a rotating shaft, the inclined position of the inner projection 18 facilitates the lubrication of the seal since the surface of the shaft moves out from under the projection 18 as the shaft rotates and a film of the fluid forms on the surface of the shaft to be carried under the projection 18. Of course, when the shaft 22 is of the reciprocating type, the film of liquid will be carried under the seal in the usual manner to provide the desired lubrication.

Reference should now be made to FIGURE 3 which illustrates a typical installation of a seal incorporating this invention on a piston head wherein the seal ring moves along inside the mating surface. Normally the pressure of fluid being sealed can be applied to either side of a piston head so two opposed rings 10 are used. The piston head 36 is formed with a through bore 37 through which the ends 38 of a piston rod 39 projects. The piston head 36 is formed with a radially extending shoulder 41 extending to an outer wall 42 which fits within a bore 43 formed in a cylinder member 44 with clearance 46. The clearance has been exaggerated for purposes of illustration. On opposite sides of the shoulder 41 the piston head 36 is formed with cylindrical surfaces 47 and 48 which have a diameter larger than the inner diameter of the projection 18 of the rings 10 so that interference is provided. On both ends of the piston head 36 are mounted end plates 49 and 50. The end plate 49 cooperates with the cylindrical surface 47 and the left end of the shoulder 41 to form a groove for the left ring 10 while the end plate 50 cooperates with the cylindrical surface 48 and the right wall of the shoulder 41 to form a groove for the right ring 10. A piston rod 39 is formed with a shoulder 51 against which the end plate 50 is seated. A nut 52 threaded onto the left end of the piston rod 39 securely holds the piston head assembly in position. Any suitable type static seal may be provided between the piston rod 39 and the piston head 36.

The left ring 10 is mounted with its open end 14 adjacent to the end plate 49 and the right ring 10 is mounted with its open end 14 adjacent to the end plate 50. When the fluid under pressure on the left side of the piston head 36 is higher than the pressure on the right side, this pressure enters the left ring 10 to increase the sealing engagement and prevent leakage. Conversely, when the pressure of the fluid on the right side of the piston head 36 is higher than the pressure on the left side, the right ring 10 provides the sealing.

Here again, the two projections 18 and 20 on each of the rings 10 can be deflected radially through a substantial range without producing excessive pressures or distortion of the ring so that the pre-set or initial sealing pressure will not be excessive. Also, since the projections can be displaced radially through a substantial range without excessive pressures or the like, a substantial range of variation in the dimensions of the mating surface can be tolerated.

When the pressures to be encountered are very high, it is preferable to form the ring of laminations of thin walled elements, as illustrated in FIGURE 5, so that the walls can be deflected easily while provided the necessary strength to support the pressure encountered. In such embodiments, the ring 60 is formed of a plurality of nested cup-shaped elements 61, 62 and 63 which are sealed by a bond or weld 64 at the edges along an open end 66 to prevent the entry of fluid under pressure between the laminations.

The inner leg 67 is formed with a continuous projecting portion 68 inclined relative to the axis of the ring 60. The path of the projection may either be serpentine as in the embodiment of FIGURE 4 or shaped as the embodiment of FIGURE 1. The outer leg 69 is also formed with a similar outwardly projecting portion 71. Because a plurality of thin wall elements are used the total strength is high but the ring can be deflected easily. Normally the outer element 61 is formed of a material having good wear properties and a low coefficient of friction with the mating surface.

Reference should now be made to FIGURE 6 where another embodiment of a sealing ring 72 incorporating this invention is illustrated. For purposes of illustration the outer element 81 is cut away in the lower half of the ring to allow illustration of the base 73. In this embodiment a base 73 is formed with an inner projection 74 which extends along a path in a plan perpendicular to the axis of the ring. A similar outer projection 76 is also formed in the outer leg of the ring. The two projections 74 and 76 are formed with a plurality of symmetrically arranged axially extending slots or cuts 77 which extend the length of the projection and form a plurality of individual leaf springs 78 which cooperate with adjacent leaves to extend completely around the two rings. In order to prevent leakage through the slots 77, an inner thin wall cup-shaped element 79 is formed to fit against the inner surface of the base 73 and an outer cup-shaped element 81 is formed to fit against the outer surface thereof. The two elements 79 and 81 are formed with imperforate walls which may be very thin and still provide the necessary strength to bridge the slots since the unsupported sections bridging the slots are very narrow. The two cup-shaped elements 79 and 81 are bonded at their open end by a weld 82 to prevent leakage along the base 83 between the elements 79 and 81. This weld does not prevent sliding of the elements 79 and 81 relative to the base in the zone along the slots 77 so the base can flex without imposing localized strain. Here again, Babbitt metal or bearing bronze can be used to form the outer cup-shaped element 81 to provide low friction and wear. The leaf springs 78 of the base 73 act as low rate springs which permit substantial deflections of the projections without producing excessive pressures. Therefore, a substantial amount of interference can be tolerated between the ring and the mating element and a substantial amount of wear can be tolerated before the interference is lost and seal failure occurs.

Although preferred embodiments of this invention are illustrated, it is to be understood that various modifications and rearrangements of parts may be resorted to without departing from the scope of the invention as defined in the following claims.

What is claimed is:

1. A seal comprising a ring formed of metal having axially extending spaced substantially parallel concentric legs having an imperforate surface and connected at one end by an imperforate end wall, annular projecting means integrally formed of said metal on each leg intermediate its ends and extending in a direction away from the other of said legs, each leg being formed of a base metal having a plurality of axially extending slots symmetrically formed in the portion of the base metal constituting the said projecting means and an imperforate layer of thin metal on each side of said base metal preventing leakage of fluid through said slots, said projecting means having a spring rate with respect to pressures producing changes in circumferential length of the extremities thereof which is substantially less than the spring rate of said base metal determined by its modulus of elasticity.

2. A seal comprising a metallic ring having axially extending spaced concentric legs connected at one end by an imperforate end wall to form a U and an annular projecting portion on each leg intermediate the ends thereof extending in a direction away from the other leg, each of said projections extending along a path around said ring having substantial portions inclined with respect to a plane perpendicular to the axis of the ring, said legs and end wall being formed of a plurality of nested elements having a similar shape, and an annular weld connecting the ends of the associated legs preventing fluid from entering between said elements, at least one of said layers being imperforate over its entire area, the paths of said projections being the least and greatest circumferences for said ring.

3. A seal comprising a ring formed of metal with an axially extending substantially cylindrical leg, each end of said leg laying along a plane substantially perpendicular to the central axis of said leg, mounting means joined to one end of said leg adapted to mount said ring on an associated member with a fluid-tight seal therewith, said leg being formed with a radially extending projection intermediate its ends extending around said leg along a serpentine path having substantial sections inclined with respect to said planes, said projection having a first portion substantially adjacent to one end of said leg and a second portion circumferentially spaced from said first portion and substantially adjacent the opposite end of said leg, the extremity of said projection when unstressed having a first circular projected area on said planes, the extremity of said projection being adapted to engage and seal with a cylindrical surface which is movable relative to said ring, said engagement being adapted to produce radial deflections of the extremity of said projection so that after deflection said extremity has a second circular projected area on said plane coaxial with said first projected area and having a radius different than the radius of said first projected area, the stresses in the metal forming said leg produced by said radial deflections being principally bending stresses rather than hoop stresses.

4. A seal as set forth in claim 3 wherein said leg is formed of a base metal and at least said extremity of said projection being coated with a thin layer of bearing metal having a lower modulus of elasticity than said base metal.

5. A seal as set forth in claim 3 wherein there is an even number of said first portions with each first portion located diametrically opposite another first portion, and there is a similar even number of second portions with each second portion located diametrically opposite another second portion whereby when said seal is exposed to fluid under pressure the pressure forces on said leg are balanced with respect to said central axis.

6. A seal as set forth in claim 3 wherein said mounting means includes a radially spaced second leg concentric with and substantially parallel to said first-named leg, and an imperforate end wall joining adjacent ends of said legs, said second leg being formed with a projection which is similar to and extends along a serpentine path concentric with the projection on said first-named leg, each projection extending in a direction radially away from the adjacent portions of the other projection.

7. A seal as set forth in claim 6 wherein each leg is provided with an even number of said first portions with each first portion located diametrically opposite another first portion, and there is a similar even number of second portions with each second portion located diametrically opposite another second portion whereby when said seal is exposed to fluid under pressure the pressure forces on each of said legs are balanced with respect to the central axis.

8. A seal comprising a ring formed of metal having an axially extending substantially cylindrical leg having an imperforate surface, and mounting means joined to one end of said leg adapted to mount said ring on an associated member with a fluid-tight seal therewith, said leg being formed with annular projecting means integrally formed of said metal intermediate its ends and extending radially with respect to said leg, said leg being formed of a base metal having a plurality of axially extending slots symmetrically formed in the portion of the base metal constituting the said projecting means and an imperforate layer of thin metal on each side of said base metal preventing leakage of fluid through said slots, said projecting means having a spring rate with respect to pressures producing changes in circumferential length of the extremity thereof which is substantially less than the spring rate of said base metal determined by its modulus of elasticity.

9. A seal comprising a metallic ring having an axially extending substantially cylindrical leg, and mounting means joined to one end of said leg adapted to mount said ring on an associated member with a fluid-tight seal therewith, and an annular projecting portion on said leg intermediate the ends thereof extending radially with respect to the central axis of said leg, said projection extending along a path around said ring having substantial portions inclined with respect to a plane perpendicular to the central axis of said ring, said leg being formed of a plurality of nested elements having a similar shape, and an annular weld connecting the ends of said nested elements preventing fluid from entering between said elements, at least one of said elements being imperforate over its entire area.

References Cited by the Examiner

UNITED STATES PATENTS

| | | |
|---|---|---|
| Re. 16,978 | 5/1928 | Joyce. |
| 1,253,902 | 1/1918 | Steinhart _____ 138—166 |
| 2,405,152 | 8/1946 | Kilchenmann. |
| 2,482,558 | 9/1949 | Scaringella _____ 138—166 X |
| 2,498,080 | 2/1950 | Jasse _____ 277—205 X |
| 3,045,830 | 7/1962 | Fulton _____ 285—139 X |
| 3,147,015 | 9/1964 | Hanback _____ 277—205 |
| 3,147,984 | 9/1964 | Benoit _____ 277—237 |

FOREIGN PATENTS

| | | |
|---|---|---|
| 610,973 | 6/1926 | France. |
| 711,125 | 6/1931 | France. |

OTHER REFERENCES

Bornholdt, B 26,683, January 1956, Germany.

LAVERNE D. GEIGER, *Primary Examiner.*

HENRY T. KLINKSIEK, *Examiner.*